United States Patent Office 3,379,753
Patented Apr. 23, 1968

3,379,753
HYDROXYALKYLCARBOXYLIC ACID ESTERS OF HYDROXYMETHYLATED DIPHENYL ETHER
Bart J. Bremmer, Midland, and James P. Easterly, Bay City, Mich., assignors to The Dow Chemical Company, Midland, Mich., a corporation of Delaware
No Drawing. Filed Oct. 18, 1965, Ser. No. 497,559
4 Claims. (Cl. 260—484)

This invention relates to new chemical compounds. These compounds are aromatic ether esters of hydroxy-aliphatic acids such as glycolic acid, lactic acid, and hydracrylic acid, which esters have the general formula

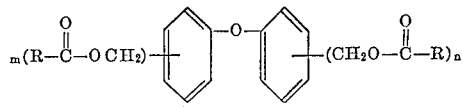

wherein R is hydroxyalkyl of 1–2 carbon atoms, that is, hydroxymethyl or hydroxyethyl, and $m$ and $n$ are integers, $m$ being 0–2 and $n$ being 1–2.

These new esters are colorless or nearly colorless crystalline solids of relatively low melting point when prepared as pure compounds. They are more conveniently prepared as mixtures of esters of the above formula and such mixtures are ordinarily viscous liquids which can in some cases be induced to crystallize. These mixed esters are at least as useful for many applications as the pure compounds. The esters can be made by a conventional esterification reaction of the hydroxy acid or derivative thereof with a hydroxymethylated diphenyl ether. A particularly convenient method for their preparation comprises reacting an inorganic salt of the hydroxyacid, e.g., the ammonium or alkali metal salt, with a chloromethylated or bromomethylated diphenyl ether, preferably in the presence of a trialkyl amine or a corresponding quaternary ammonium salt.

In the latter procedure, the hydroxyacid salt and halomethylated ether reactants can be employed in any molar ratio, but the best results are obtained when the salt is present in at least the quantity theoretically required to react with all of the halomethyl groups present. A slight excess of salt is preferred. A lower alkyl tertiary amine such as triethylamine or N,N-dimethylbutylamine or a corresponding quaternary salt such as tetramethylammonium chloride or benzyltrimethylammonium iodide facilitates the reaction when present in about 0.1–10 percent by weight of the reactants. Tetraalkylammonium iodides such as tetraethylammonium iodide or butyltriethylammonium iodide have been found to be particularly efficient promoters.

The reaction is accomplished by contacting the reagents and promoter at about 75–125° C., preferably in the presence of a solvent such as dioxane, dimethyl sulfoxide, acetone, methyl ethyl ketone, or the like. It is often advantageous to conduct the reaction under pressure in order to provide a reaction temperature above the boiling point of the solvent and thereby shorten the reaction time. The ester product can be separated from the reaction product by conventional means. Yields are usually near quantitative.

Example 1

A mixture of 93 g. of p,p'-bis(α-chlorotolyl) ether, 73.5 g. of sodium glycolate, 5 g. of butyltriethylammonium iodide, and 200 ml. of acetone was stirred for 4 hours at 100° C. in a pressure reactor. The reactor was cooled and vented and the reaction mixture was heated to 50° C. under reduced pressure to distil off nearly all of the acetone. The residual mixture was stirred with 1.5 liters of water and filtered to obtain 118 g. of a light tan solid, M.P. 113–118° C. A recrystallized sample melted at 119–120° C. Elemental analysis, molecular weight determination, and examination of its infrared absorption spectrum confirmed the identity of the product as the expected p,p'-oxydibenzyl diglycolate.

Example 2

A quantity of 90 g. of chloromethylated diphenyl ether having the following composition:

| | Wt. percent |
|---|---|
| o- and p-Mono(chloromethyl)diphenyl ether | 3.8 |
| o,p'-Bis(chloromethyl)diphenyl ether | 22.0 |
| p,p'-Bis(chloromethyl)diphenyl ether | 44.8 |
| Tris-bis(chloromethyl)diphenyl ether | 22.0 |
| Tetrakis (chloromethyl) diphenyl ether | 3.8 | was mixed with 73.5 g. of sodium glycolate, 5 g. of butyltriethylammonium iodide, and 200 ml. of acetone. The mixture was reacted and worked up essentially as described in Example 1. The crude product was a very viscous light yellow liquid, weight 117 g., which crystallized on standing. Analysis of this product showed it to be a mixture of the glycolates of the hydroxy-methylated diphenyl ethers corresponding in their structure and molar proportion to the chloromethylated diphenyl ethers in that starting material. These glycolates were essentially ortho- and para-phenoxybenzyl glycolate, o,p'- and p,p'-oxydibenzyl diglycolate, 2,4,4'-tris(hydroxymethyl)diphenyl ether triglycolate, and 2,2', 4,4'-tetrakis(hydroxymethyl) diphenyl ether tetraglycolate.

Example 3

A quantity of 148 g. of chloromethylated diphenyl ether having the following composition:

| | Wt. percent |
|---|---|
| o-Mono(chloromethyl)diphenyl ether | 10.2 |
| p-Mono(chloromethyl)diphenyl ether | 45.8 |
| o,p'-Bis(chloromethyl)diphenyl ether | 13.1 |
| p,p'-Bis(chloromethyl)diphenyl ether | 14.0 |
| Tris(chloromethyl)diphenyl ether | 2.6 |
| Tetrakis(chloromethyl)diphenyl ether | 0.2 |
| Remainder largely diphenyl ether | | was mixed with 73.5 g. of sodium glycolate, 5 g. of butyltriethylammonium iodide, and 200 ml. of acetone and the mixture was stirred for 4 hours at 100° C. in a pressure reactor. The reactor was cooled and vented and the contents were filtered to remove suspended salt. The filtrate was heated to 85° C. under reduced pressure to remove the volatile material. The residue was a light yellow viscous liquid weighing 174 g. This product was found to be a mixture of the glycolates of the hydroxymethylated diphenyl ethers corresponding to the chloromethylated ethers in the starting material.

Example 4

A mixture of 76 g. of chloromethylated diphenyl ether containing 16.5 percent by weight of α,α'-dichloroditolyl ether, 64.9 percent of tris(chloromethyl)diphenyl ether, and 15.0 percent of tetrakis(chloromethyl)diphenyl ether, 73.5 g. of sodium glycolate, 5 g. of butyltriethylammonium iodide, and 200 ml. of acetone was reacted and then worked up as described in Example 3. The product was an extremely viscous pale yellow liquid, weight 105 g. This material was a mixture consisting essentially of oxydibenzyl diglycolate, tris(hydroxymethyl)diphenyl ether triglycolate, and tetrakis(hydroxymethyl)diphenyl ether tetraglycolate corresponding in isomer distribution and molar proportion to the chloromethylated diphenyl ether starting material.

By the general procedure of the foregoing examples, particular glycolates such as p-phenoxybenzyl glycolate, o,p'-oxydibenzyl diglycolate, 2,4,4'-tris(hydroxymethyl)

diphenyl ether triglycolate, and 2,2′,4,4′-tetrakis(hydroxymethyl)diphenyl ether tetraglycolate are obtained as pure crystalline compounds from the individual chloromethylated diphenyl ethers. Similarly, when the sodium glycolate reactant of the above examples is replaced by an equivalent quantity of the sodium or potassium salt of lactic acid or hydracrylic acid (3-hydroxypropionic acid), the corresponding hydroxymethyldiphenyl ether lactates and hydracrylates are obtained. These esters are similar in appearance and properties to the homologous glycolates described above.

These compounds, both as pure compounds and as mixtures, have herbicidal activity when contacted with the foliage of broadleafed plants as the active ingredients of aqueous solutions or dispersions. They also have anthelminthic activity and will reduce or eliminate infestations of worms such as tapeworms and pinworms in animals when fed to such animals as medicinal additives to their diet.

These compounds are also useful as plasticizers in resinous compositions such as polyvinyl chloride or ethylcellulose. The polyesters, i.e., those where $m$ and $n$ in the generic formula are each 1 or 2, are polyols which are particularly valuable as monomers for the production of polyester resins by reaction with dibasic acids such as adipic acid, terephthalic acid, and the like. Such polyester resins, optionally cross-linked by reaction with a tri- or tetrahydroxyester of the present invention, can be molded into useful shapes or drawn into fibers. These new polyols are also useful as polyol reactants for making polyurethane resins.

We claim:
1. A compound having the structure

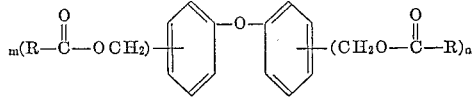

wherein R is hydroxyalkyl of 1–2 carbon atoms, $m$ is 0–2 and $n$ is 1–2.

2. The compound of claim 1 wherein R is hydroxymethyl.

3. The compound of claim 2 wherein $m$ and $n$ are each 1.

4. p,p′-Oxydibenzyl diglycolate.

References Cited
UNITED STATES PATENTS
2,865,896 12/1958 Fekete _____ 260—484 X
3,100,796 8/1963 Trapp et al. _____ 260—488

LORRAINE A. WEINBERGER, *Primary Examiner.*

A. P. HALLUIN, *Assistant Examiner.*